(12) United States Patent
Bernhard et al.

(10) Patent No.: US 9,354,081 B2
(45) Date of Patent: May 31, 2016

(54) BATTERY-OPERATED STATIONARY SENSOR ARRANGEMENT WITH UNIDIRECTIONAL DATA TRANSMISSION

(71) Applicant: Fraunhofer-Gesellschaft zur Foerderung der angewandten Forschung e.V., Munich (DE)

(72) Inventors: Josef Bernhard, Nabburg (DE); Gerd Kilian, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 278 days.

(21) Appl. No.: 14/190,258

(22) Filed: Feb. 26, 2014

(65) Prior Publication Data

US 2014/0176341 A1    Jun. 26, 2014

Related U.S. Application Data

(63) Continuation of application No. PCT/EP2012/066905, filed on Aug. 30, 2012.

(30) Foreign Application Priority Data

Sep. 2, 2011  (DE) .......... 10 2011 082 098

(51) Int. Cl.
  *G08B 21/00* (2006.01)
  *G01D 4/00* (2006.01)
  *H04Q 9/00* (2006.01)
  *H04W 56/00* (2009.01)
(52) U.S. Cl.
  CPC .......... *G01D 4/002* (2013.01); *H04Q 9/00* (2013.01); *H04W 56/00* (2013.01); *H04Q 2209/60* (2013.01); *H04Q 2209/82* (2013.01); *Y02B 90/241* (2013.01); *Y04S 20/32* (2013.01)

(58) Field of Classification Search
  CPC .......... G01D 4/002; H04Q 2209/60; H04Q 2209/82; H04W 56/00; Y04S 20/32
  USPC .......... 340/870.02
  See application file for complete search history.

(56) References Cited

U.S. PATENT DOCUMENTS 7,057,525 B2    6/2006   Giles et al.
2003/0020632 A1*  1/2003   Giles .......... G01D 4/004
                                        340/870.02

(Continued)

FOREIGN PATENT DOCUMENTS

CN    101911633 A    12/2010
EP    1 246 501 A2    10/2002
EP    1246501 B1    11/2010

OTHER PUBLICATIONS

English translation of Official Communication issued in corresponding International Application PCT/EP2012/066905, mailed on Mar. 13, 2014.

(Continued)

*Primary Examiner* — Mark Rushing
(74) *Attorney, Agent, or Firm* — Keating & Bennett, LLP

(57) ABSTRACT

Embodiments of the present invention provide a battery-operated stationary sensor arrangement with a unidirectional data transmission. The battery-operated stationary sensor arrangement has a sensor, a means for generating data packets and a means for transmitting data packets. The transmitter is implemented to determine sensor data and provide a sensor data packet based on the sensor data, wherein the sensor data has an amount of data of less than 1 kbit. The means for generating data packets is implemented to divide the sensor data packet into at least two data packets, wherein each of the at least two data packets is shorter than the sensor data packet. The means for transmitting data packets is implemented to transmit the data packets with a data rate of less than 50 kbit/s and a time interval via a communication channel.

15 Claims, 10 Drawing Sheets

Example: transmission 75 byte data packet data rate: 20 kbit/s
packet length: 10 ms (= 200 bits)
overall telegram length: 220 s (-> update rate approx. 4 min)

(56) References Cited

U.S. PATENT DOCUMENTS

2006/0146887 A1* 7/2006 Muguruma ........... H04W 56/00
370/503
2009/0175261 A1* 7/2009 Oh ........................ H04L 1/0079
370/350
2010/0265863 A1* 10/2010 Cordeiro .............. H04B 1/7176
370/311

OTHER PUBLICATIONS

English Translation of Official Communication issued in corresponding Chinese Patent Application No. 2012800509256, mailed on Jul. 15, 2015.
Official Communication issued in International Patent Application No. PCT/EP2012/066905, mailed on May 7, 2013.

* cited by examiner

BATTERY-OPERATED STATIONARY SENSOR ARRANGEMENT WITH UNIDIRECTIONAL DATA TRANSMISSION

CROSS-REFERENCE TO RELATED APPLICATIONS

This application is a continuation of copending International Application No. PCT/EP2012/066905, filed Aug. 30, 2012, which is incorporated herein by reference in its entirety, and additionally claims priority from German Patent Application No. 102011082098.1, filed Sep. 2, 2011, which is also incorporated herein by reference in its entirety.

BACKGROUND OF THE INVENTION

Embodiments of the present invention relate to a battery-operated stationary sensor arrangement with unidirectional data transmission. Further embodiments of the present invention relate to a hybrid method for a wireless transmission of burst-type data packets in a stationary multi-user system.

In the transmission of small amounts of data, e.g. of sensor data of a heating, current or water meter, a radio transmission system may be used. Here, a measurement means with a data transmitter is attached to the sensor which wirelessly transmits the sensor data to a data receiver.

U.S. Pat. No. 7,057,525 B2 describes a system for a unidirectional remote counter or meter readout having two means, one means which generates short transmission packets for the mobile reception and one means which generates narrow-banded transmission packets receivable across a larger distance from a stationary receiver. Here, the two signals sent are only different with respect to signal bandwidth.

SUMMARY

According to an embodiment, a battery-operated stationary sensor arrangement with a unidirectional data transmission may have: a sensor for determining sensor data and for providing a sensor data packet based on the sensor data, the sensor data having an amount of data of less than 1 kbit; a means for generating data packets which is implemented to divide the sensor data packet into at least two data packets, wherein each of the at least two data packets is shorter than the sensor data packet; and a means for transmitting data packets which is implemented to transmit the data packets with a data rate of less than 50 kbit/s and a time interval across the communication channel, wherein the means for generating data packets is implemented to divide a synchronization sequence into partial synchronization sequences and to provide each data packet with one of the partial synchronization sequences for a synchronization of the data packet in a data receiver.

According to another embodiment, a system may have a battery-operated stationary sensor arrangement as mentioned above and a data receiver for receiving the sensor data packet having: a means for receiving data packets implemented to receive the at least two data packets and to combine the at least two data packets and determine the sensor data packet; and a means for reading out the sensor data packet implemented to determine the sensor data from the sensor data packet and to allocate the sensor data to the battery-operated stationary sensor arrangement.

According to another embodiment, a method for transmitting a sensor data packet in a battery-operated stationary sensor arrangement with a unidirectional data transmission may have the steps of: determining sensor data with a sensor and providing a sensor data packet based on the sensor data, wherein the sensor data has an amount of data of less than 1 kbit; generating data packets, wherein in the generation of data packets the sensor data packet is divided into at least two data packets, and wherein each of the at least two data packets is shorter than the sensor data packet; and transmitting the at least two data packets with a data rate of less than 50 kbit/s and a time interval via a communication channel, wherein when generating data packets a synchronization sequence is divided into partial synchronization sequences and each data packet is provided with one of the partial synchronization sequences for a synchronization of the data packet in a data receiver.

Another embodiment may have a computer program having a program code for executing the above method for transmitting a sensor data packet, when the computer program is executed on a computer or microprocessor.

According to still another embodiment, a battery-operated stationary sensor arrangement with unidirectional data transmission may have: a sensor for determining sensor data and for providing a sensor data packet based on the sensor data, wherein the sensor data has an amount of data of less than 1 kbit; a means for generating data packets implemented to divide the sensor data packet into at least three data packets, wherein each of the at least three data packets is shorter than the sensor data packet; and a means for transmitting data packets implemented to transmit the data packets with a data rate of less than 50 kbit/s and a time interval via a communication channel; wherein the means for generating data packets is implemented to channel-encode the at least three data packets such that only a part of the data packets is necessitated for decoding the sensor data packet.

According to another embodiment, a battery-operated stationary sensor arrangement with unidirectional data transmission may have: a sensor for determining sensor data and for providing a sensor data packet based on the sensor data, wherein the sensor data has an amount of data of less than 1 kbit; a means for generating data packets implemented to divide the sensor data packet into at least two data packets, each of the at least two data packets being shorter than the sensor data packet; and a means for transmitting data packets implemented to transmit the data packets with a data rate of less than 50 kbit/s and a time interval via a communication channel; wherein the means for generating data packets is implemented to additionally divide the sensor data packet into at least three data packets, each of the at least three data packets being shorter than the sensor data packet; and the means for transmitting data packets being implemented to transmit the at least two data packets with a first transmission frequency via the communication channel and to transmit the at least three data packets with a second transmission frequency via the communication channel.

The present invention provides a battery-operated stationary sensor arrangement with a unidirectional data transmission. The battery-operated stationary sensor arrangement comprises a sensor, a means for generating data packets and a for transmitting data packets. The sensor is implemented to determine sensor data and to provide a sensor data packet based on the sensor data, wherein the sensor data comprises an amount of data of less than one kbit. The means for generating data packets is implemented to divide the sensor data packet into at least two data packets, wherein each of the at least two data packets is shorter than the sensor data packet. The means for transmitting data packets is implemented to transmit the data packets via a communication channel with a data rate of less than 50 kbit/s and a time interval.

In embodiments, the sensor data packet is divided into at least two data packets, wherein the data packets are transmitted across the communication channel with a data rate of less than 50 kbit/s and a time interval. As compared to a conventional battery-operated stationary sensor arrangement wherein the sensor data packet is transmitted via the communication channel with a data rate of e.g. 100 kbit/s, the SNR ratio (signal to noise ratio) at the data receiver is increased and thus also the range is increased. Apart from that, by dividing the sensor data packet into the at least two data packets and by the transmission of the at least two data packets via the communication channel with a time interval, on the one hand battery load and on the other hand transmission error probability are reduced.

BRIEF DESCRIPTION OF THE DRAWINGS

Embodiments of the present invention will be explained in more detail below with reference to the accompanying drawings, in which.

DETAILED DESCRIPTION OF THE INVENTION

Figure 1:
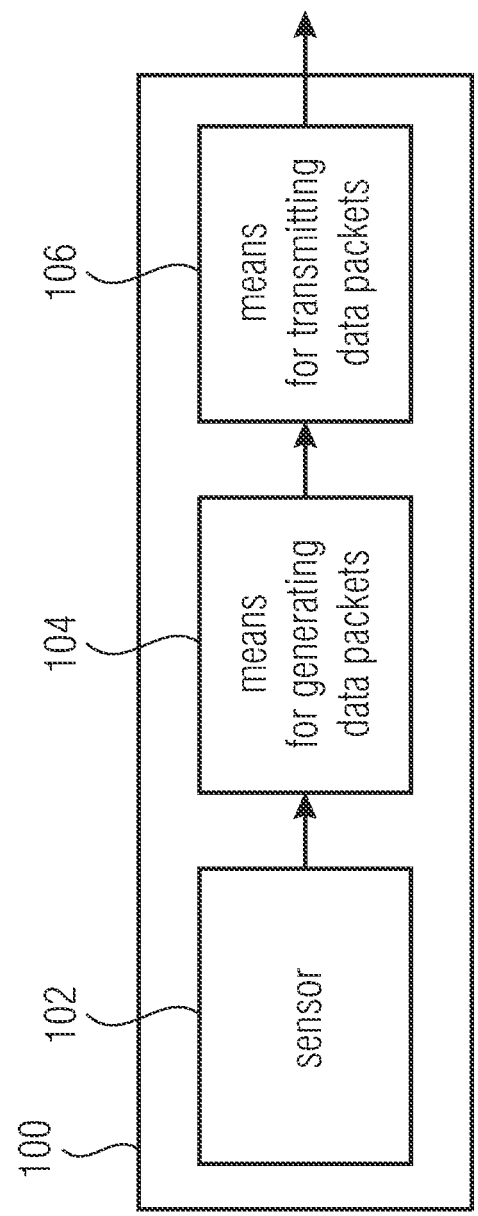
FIG. 1 is a block diagram of a battery-operated stationary sensor arrangement with a unidirectional data transmission according to one embodiment of the present invention.

In the following description of the embodiments of the invention, in the figures like or seemingly like elements are provided with the same reference numerals, so that a description of the same in the different embodiments is mutually interchangeable.

FIG. 1 shows a block diagram of a battery-operated stationary sensor arrangement 100 with a unidirectional data transmission. The battery-operated stationary sensor arrangement 100 comprises a sensor 102, a means 104 for generating data packets and a means 106 for transmitting data packets. The sensor 102 is implemented to determine sensor data and to provide a sensor data packet based on the sensor data, wherein the sensor data comprises an amount of data of less than 1 kbit. The means 104 for generating data packets is implemented to divide the sensor data packet into at least two data packets, wherein each of the at least two data packets is shorter than the sensor data packet. The means 106 for transmitting data packets is implemented to transmit the data packets with a data rate of less than 50 kbit/s and a time interval across a communication channel.

Figure 2:
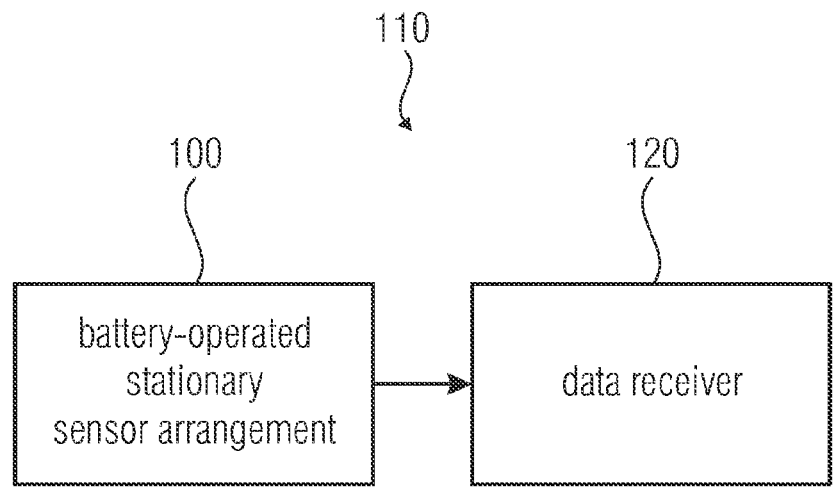
FIG. 2 is a block diagram of a system with a battery-operated stationary sensor arrangement and a data receiver according to one embodiment of the present invention.

In embodiments, for increasing the range, the sensor data is transmitted in a narrow-banded way with a data rate of less than 50 kbit/s, e.g. 40 kbit/s, 30 kbit/s, 20 kbit/s or 10 kbit/s instead of, e.g., a data rate of 100 kbit/s. In a system 110 with a battery-operated, stationary sensor arrangement 100 (data transmitter) with a unidirectional data transmission (i.e. without reverse channel) and a data receiver 120, as e.g. illustrated in FIG. 2, the SNR ratio at the data receiver 120 increases and thus also the range increases. As a consequence, however, the bit duration increases and thus the transmitted energy per bit increases in the inventive system 110 with the low data rate. As the battery in the system 110 may not be put under load for a long time but may only provide a higher power for a short time, the longer bit duration is a problem. In order to guarantee a long battery lifetime only short bursts ought to be sent out. This is why the narrow-banded sensor data packet is divided into smaller data packets (partial packets) in order to only have a short pulse-type load of the battery. Further, the data packets may be channel-coded, e.g. such that not all data packets but only a certain portion is necessitated for decoding the information.

The sensor 102 of the battery-operated stationary sensor arrangement 100 may be a sensor or counter, like e.g. a temperature sensor, heating, current or water counter or meter, wherein the sensor data may be a sensor value or counter reading. The inventive system 110 with the battery-operated stationary sensor arrangement 100 (data transmitter) and the data receiver 120 comprises no reverse channel. The data transmitter 100 may here send out the sensor data at a pseudorandom time, wherein the data receiver 120 may receive sensor data from several (different) data transmitters 100.

Figure 3:
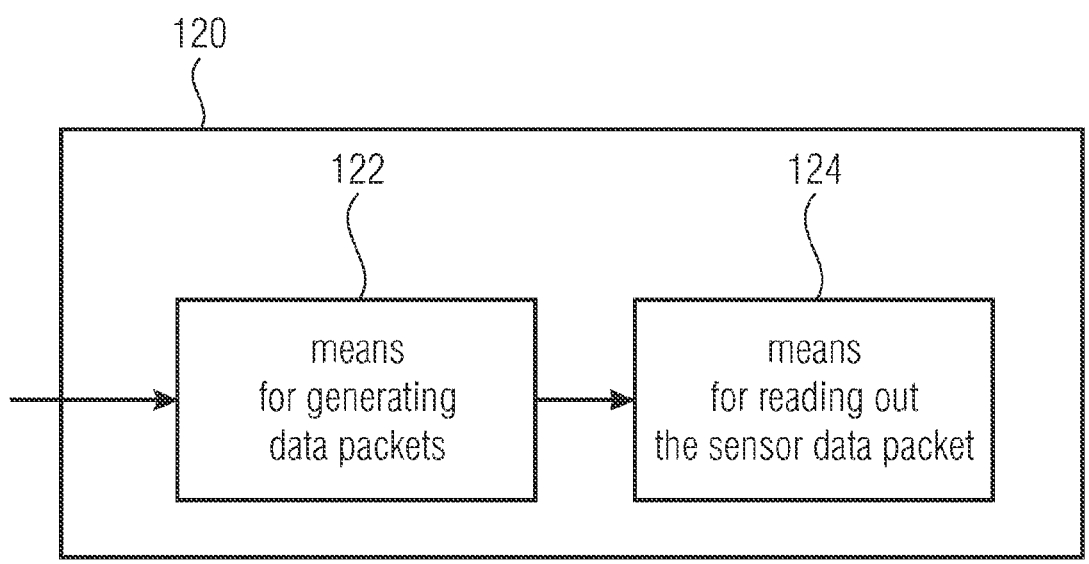
FIG. 3 is a block diagram of a data receiver according to one embodiment of the present invention.

FIG. 3 shows a block diagram of a data receiver 120 according to one embodiment of the present invention. The data receiver 120 comprises a means 122 for receiving data packets and a means 124 for reading out the sensor data packet. The means 122 for receiving data packets is implemented to receive the at least two data packets and to combine the at least two data packets in order to determine the sensor data packet. The means 124 for reading out the sensor data packet is implemented to determine the sensor data from the sensor data packet and to allocate the sensor data to the battery-operated stationary sensor arrangement 100.

For the synchronization of the data packet in the data receiver 120 the means 104 for generating data packets of the battery-operated stationary sensor arrangement 100 may be implemented to divide a synchronization sequence into partial synchronization sequences in order to provide each data packet with one of the partial synchronization sequences.

The means 122 for receiving the data packets of the data receiver 120 may here be implemented to localize the data packets in a received data stream based on the partial synchronization sequences in order to receive the data packets.

For the synchronization of the data packets in the data receiver 120 thus synchronization sequences may be utilized. Synchronization sequences are deterministic or pseudorandom binary data sequences, e.g. PRBS sequences (pseudo random bitstream), which are transmitted together with the actual payload data or sensor data in the data packets to the data receiver 120. The data receiver 120 knows the synchronization sequences. By a correlation of the receive data stream with the known synchronization sequence the data receiver 120 may determine the temporal position of the known synchronization sequence in the receive data stream. Here, the correlation function comprises a correlation peak at the location of the synchronization sequence in the receive data stream, wherein the higher or greater the peak the better the receive data stream corresponds to the known synchronization sequence. To further keep the burst-type data packets short, for a synchronization also the synchronization sequence may be distributed across the individual short data packets, so that the individual data packet shows worse synchronization characteristics than the synchronization across several data packets. In order to utilize this synchronization effect, the points in time of the consecutive data packets may be known to the data receiver 120. Alternatively, the means for receiving the data packets of the data receiver 120 may be implemented to determine the time interval or temporal distance of the data packets based on the partial synchronization sequences in order to localize the partial synchronization sequence in the receive data stream. As the data transmitter 100 and the data receiver 120 are stationary and thus remain unchanged across a long period of time, the data receiver 120 may be implemented to determine the time sequence of the data packets by learning methods.

The means 104 for generating data packets of the battery-operated stationary sensor arrangement 100 may be implemented to additionally divide the sensor data packet into at least three data packets, wherein each of the at least three data packets is shorter than the sensor data packet. Further, the means 106 for transmitting data packets of the battery-operated stationary sensor arrangement 100 may be implemented to transmit the at least two data packets with a first transmit frequency across the communication channel and to transmit the at least three data packets with a second transmit frequency across the communication channel.

The means 122 for receiving the data packets of the data receiver 120 may here be implemented to receive the at least two data packets on a first transmit frequency and/or to receive the at least three data packets on the second transmit frequency and to combine the at least two data packets and/or the at least three data packets in order to determine the sensor data packet.

The means 104 for generating data packets of the battery-operated stationary sensor arrangement 100 may further be implemented to encode the at least two data packets with a first code rate (information rate) and to encode the at least three data packets with a second code rate (information rate), wherein the first code rate is larger than the second code rate.

In order to additionally be robust against interferences or existing or other systems, the data packets may be distributed to different transmission frequencies or transmit frequencies (channels). For example, the data packets may be distributed to n=2, n=3, n=4, n=5, n=10 or n=20 channels.

Figure 4:
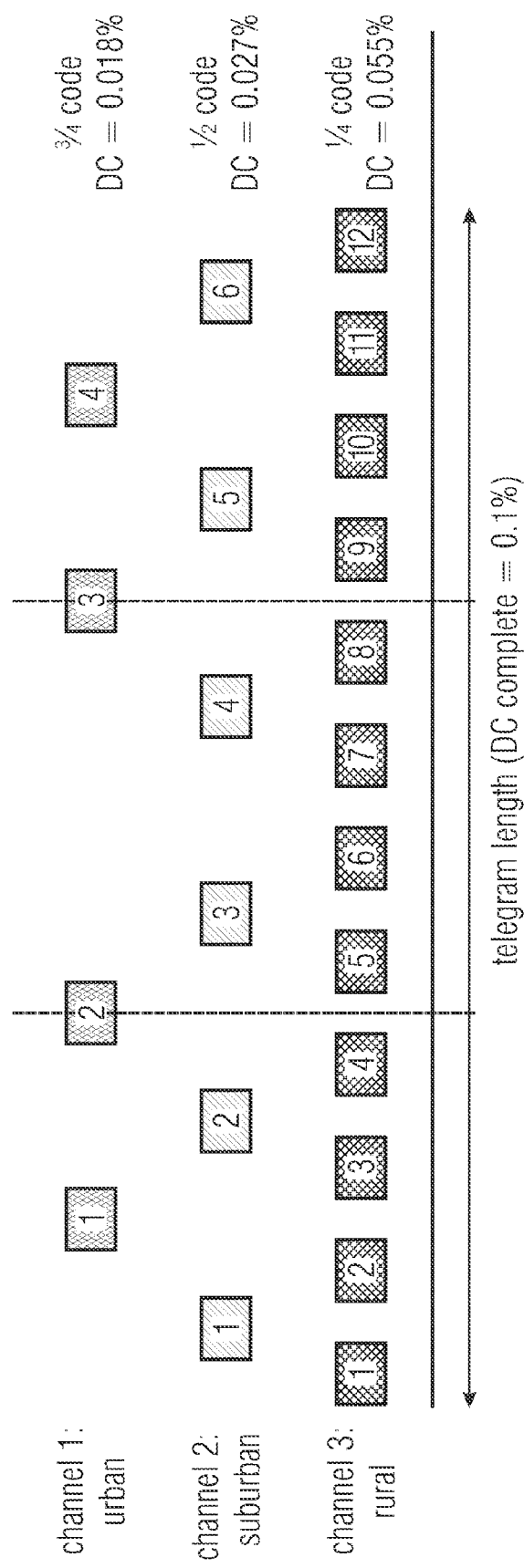
FIG. 4 is a schematic illustration of a distribution of data packets to different transmission frequencies according to one embodiment of the present invention.

FIG. 4 shows a schematic illustration of a distribution of data packets onto different transmit frequencies according to one embodiment of the present invention. In FIG. 4, the data packets are exemplarily divided into three transmit frequencies or frequency channels. The telegram to be transmitted (sensor data packet) for example comprises an amount of data of 75 bytes, wherein the data packets are for example transmitted with a data rate of 20 kbit/s across the communication channel. The length of each data packet here for example is 10 ms (=200 bits), from which an overall telegram length of 220 s (update rate approximately 4 minutes) results.

In the embodiment illustrated in FIG. 4, the means 104 for generating data packets of the battery-operated stationary sensor arrangement 100 is implemented to divide the sensor data packet into 12 data packets in order to additionally divide the sensor data packet into 6 data packets and to additionally divide the sensor data packet into 4 data packets. Further, the means 106 for transmitting the data packets of the battery-operated stationary sensor arrangement 100 is implemented to transmit the 4 data packets on a first transmission frequency (channel 1), the 6 data packets on a second transmission frequency (channel 2) and the 12 data packets on a third transmission frequency (channel 3).

Further, the data in the individual channels may be encoded differently in order to be optimal for different application scenarios. Thus, e.g. channel 3 may be encoded with a rate of ¼ and data packets are more frequently transmitted on this channel than in channel 1 by less frequently transmitting with a higher code rate of e.g. ¾. With interferences in one or the other channel it would be possible to still decode the respective other channel. In the non-interfered case, the data packets of all channels would be MLE decoded (MLE=maximum likelihood estimation). In a rural environment where the transmitter density is lower, using the code rate and the high packet transmission rate a high range could be acquired. If the transmitter density increases, in this channel an increase in collision and interferences results. With high transmitter densities in an urban environment, the lower transmission rate in channel 1 would lead to less collisions but also to a decreased range due to the higher code rate. With high transmitter densities, however, no high range is required, as due to the many collisions a load-conditioned range limitation results. Load-conditioned range limitation means that due to the occurring collisions the stronger near data transmitters (better signal-to-noise ratio) are encoded and the more remote weaker data transmitters are superimposed. It may be an advantage in embodiments to transmit with a lower code rate with higher transmitter densities, even if this results in a higher latency.

In the following, the improvements and advantages of the present invention as compared to known technology are explained in more detail.

Figure 5:
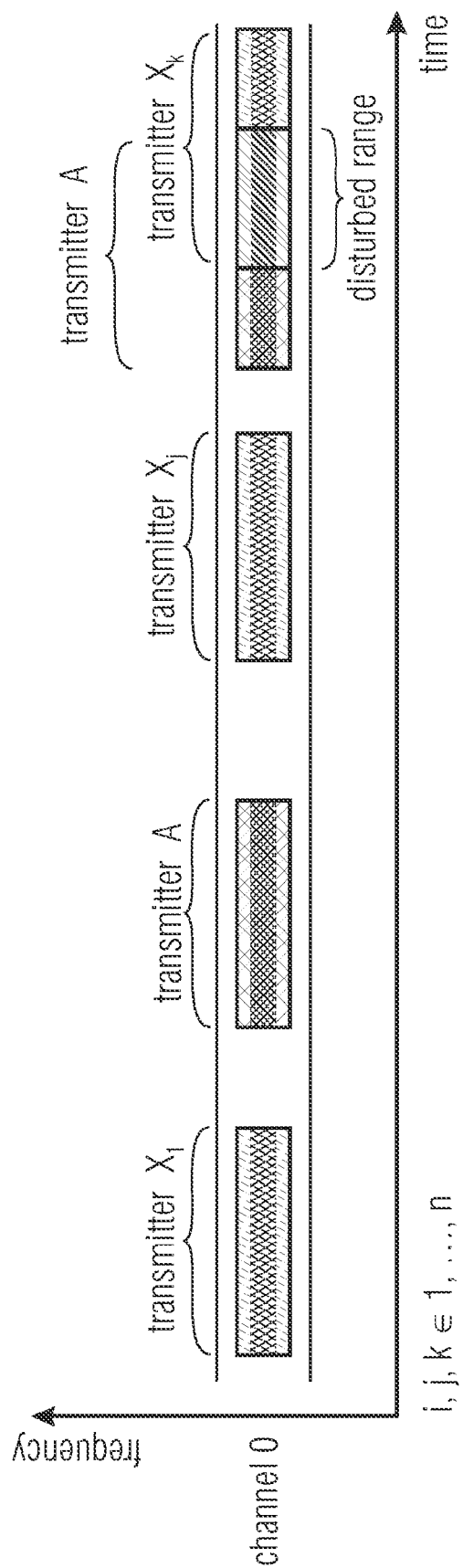
FIG. 5 is a time capacity utilization of a communication channel with the Aloha method.

FIG. 5 shows a temporal capacity utilization of a communication channel with the Aloha method. Here, the abscissa describes the time and the ordinate describes the frequency. In the Aloha method payload data is transmitted in so-called telegrams divided into one or several data packets in one channel from a data transmitter. Further, in the same channel n=0 other data transmitters $X_i$, $X_j$ and $X_k$, with $i \in \{1, \ldots, n\}$, $j \in \{1, \ldots, n\}$ and $k \in \{1, \ldots, n\}$ also transmit data packets. If the transmission of one data packet of one data transmitter X temporally overlaps sending out a data packet from data transmitter A, then as illustrated in FIG. 5 the transmission of the data packet from the data transmitter A is interfered or disturbed. Sending out data packets of the data transmitters C would happen randomly.

The length of the data packets of the data transmitter A is assumed to be $T_A$, the one of the data transmitters $X_i$ is assumed to be $T_{X,i}$. The channel occupation of one individual data transmitter $X_i$ is defined by the so-called duty cycle of the respective data transmitter $D_{X,i} = \tau/T \in [0,1]$ as a ratio of transmission time τ to operating time T. A data transmitter may here take on the transmitter state S is on (1) or off (0), i.e. $S \in \{0,1\}$. The probability for an undisturbed transmission may be approximated to be $$P(A_A) = e^{-\frac{(T_A+T_X)D_{\Sigma X}}{T_X}}.$$

Here, $D_{\Sigma X}=kD_X$ is the sum duty cycle of the interfering or disturbing data transmitter X.

For receiving a transmission, at the data receiver 120 in principle a $E_b/N_0$ depending on the used modulation and channel encoding is necessitated. $E_b$ here designates the energy per bit, $N_0$ designates the noise performance density, the performance of noise in a normalized bandwidth. The SNR ratio (signal to noise ratio) is defined as follows $$SNR = \frac{S}{N}$$

with the signal energy S and the noise performance N. The noise performance (noise power) here relates to a certain bandwidth, $N=BN_0$ applies with the bandwidth B. The signal performance is calculated to be $S=E_BD$. Thus the following applies $$\frac{E_b}{N_0} = \frac{S}{N}\frac{B}{D}$$

or $$\frac{S}{N} = \frac{E_b}{N_0}\frac{D}{B}$$

with the data rate D. With an increasing distance of the data receiver 120 to the data transmitter A, usually the received energy per bit $E_b$ decreases. In order to now increase the range of a transmission, in principle different possibilities are available.

For example, transmission performance may be increased, whereby also the energy per bit $E_b$ is increased, which may not frequently be applied from a regulatory view. Further, a modulation or channel encoding with a low $E_b/N_0$ may be used, wherein this is limited by the Shannon limit. Alternatively, the transmission duration of the telegram (sensor data packet) may be increased, whereby the data rate is reduced and the energy per bit $E_b$ is increased which is the starting point described in the following.

Figure 6:
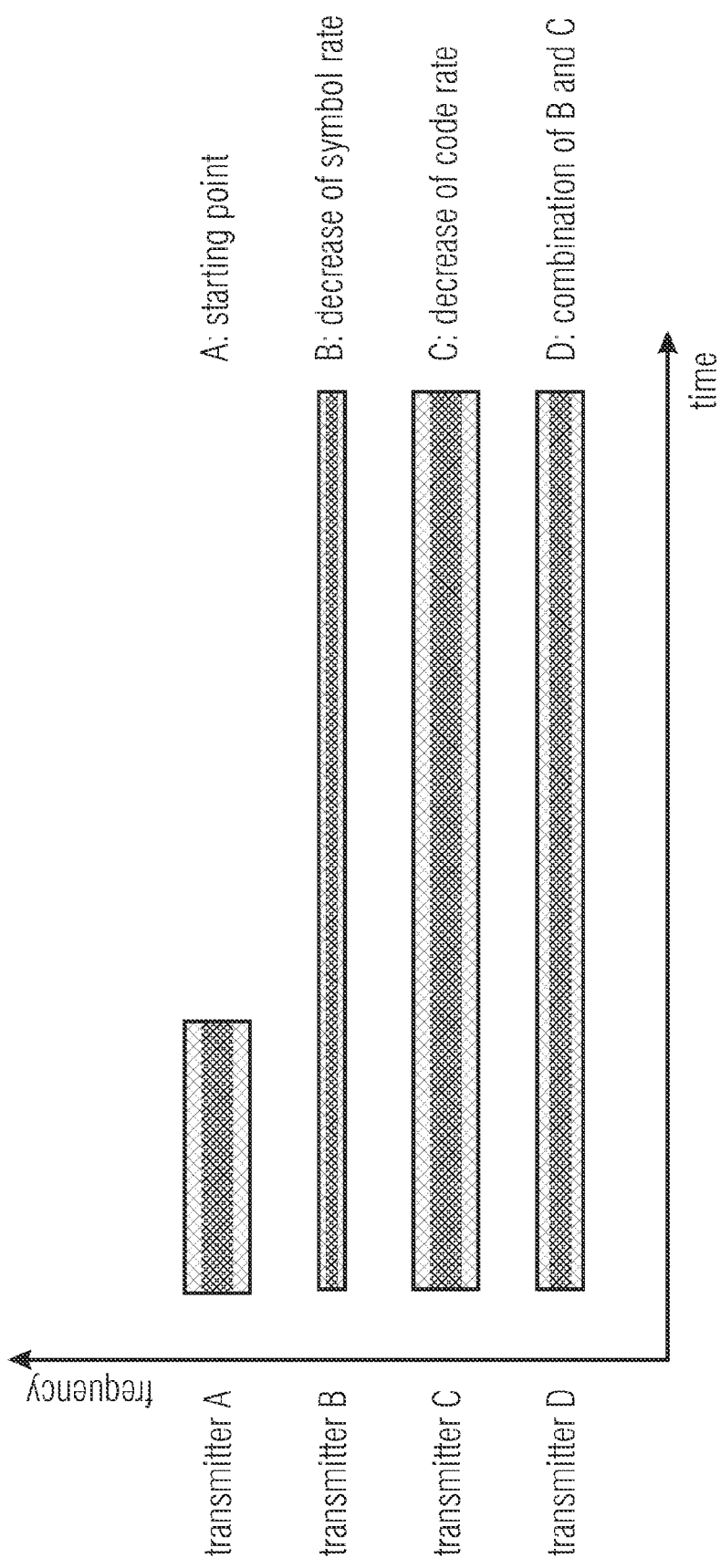
FIG. 6 in a diagram, different possibilities for increasing $E_b/N_0$ in a transmission of a telegram according to one embodiment of the present invention.

In a diagram, FIG. 6 shows different possibilities for increasing $E_b/N_0$ in a transmission of a telegram (sensor data packet) according to one embodiment of the present invention. Here, the abscissa describes the time and the ordinate describes the frequency. A decrease of the data rate of the data transmitter A, as illustrated in FIG. 6, may be caused by a lower symbol rate (transmitter B) or by the use of a lower code rate (transmitter C) or a combination of both ways (transmitter D). By this, the necessitated time for the transmission is longer, and the data transmitter 100 may emit more energy with the same transmission performance and a longer transmission time.

For example, the means for transmitting the data packets may be implemented to provide the data packets with a symbol rate of less than $1 \cdot 10^6$ symbol/s or also less than $5 \cdot 10^5$ symbol/s, $3 \cdot 10^5$ symbol/s, $2 \cdot 10^5$ symbol/s or $1 \cdot 10^5$ symbol/s and/or a code rate of less than 0.8 or also less than 0.5, 0.3, 0.25 or 0.1.

If a lower code rate is used, in general for a transmission a smaller $E_b/N_0$ is necessitated. However, the necessitated bandwidth increases as compared to the use of a slower modulation. In all outlined cases, transmission is lengthened. In case of reducing the symbol rate with $$P(A_A) = e^{-\frac{(T_A+T_X)D_{\Sigma X}}{T_X}}$$

this leads to a reduction of the transmission probability.

Figure 7:
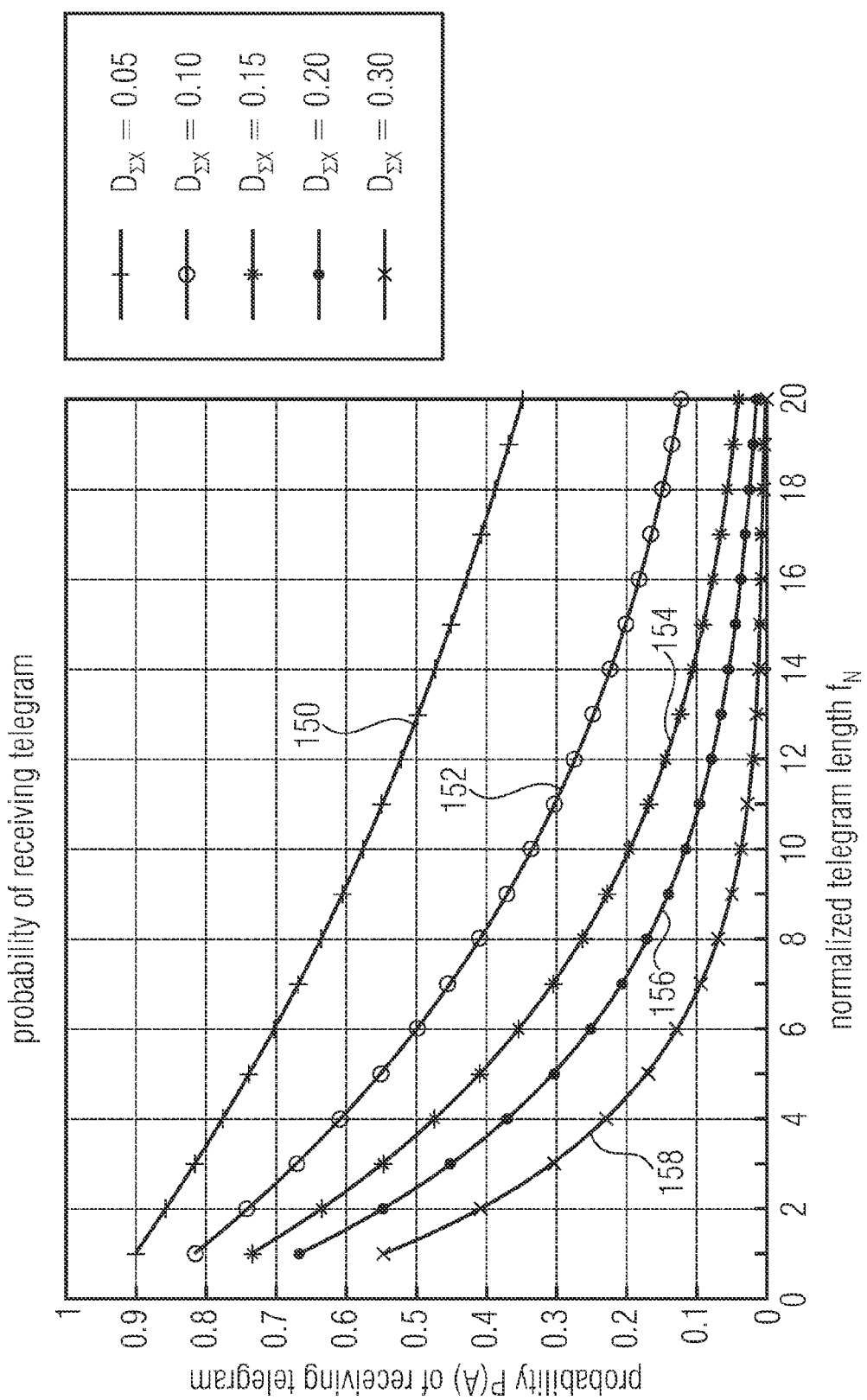
FIG. 7 is a diagram of a probability of receiving a telegram as a function of a normalized telegram length.

FIG. 7 shows a diagram of a probability of receiving a telegram (sensor data packet) as a function of a normalized telegram length. Here, the abscissa describes the normalized telegram length $f_N$ with $f_N=T_A/T_X$ and the ordinate describes the probability P(A) of receiving the telegram.

A first curve 150 describes the probability P(A) of receiving the telegram (sensor data packet), for $D_{\Sigma X}=0.05$; a second curve 152 describes the probability P(A) of receiving the telegram for $D_{\Sigma X}=0.10$; a third curve 154 describes the probability P(A) of receiving the telegram for $D_{\Sigma X}=0.15$; a fourth curve 156 describes the probability P(A) of receiving the telegram for $D_{\Sigma X}=0.20$; and a fifth curve 158 describes the probability P(A) of receiving the telegram for $D_{\Sigma X}=0.30$.

It may be seen in FIG. 7 that the probability P(A) of receiving the telegram (sensor data packet) decreases with an increasing telegram length. Further, the probability P(A) of receiving the telegram decreases with an increasing sum duty cycle $D_{\Sigma X}$. For increasing the range, however, a lengthening of the transmission duration of the telegram (sensor data packet) or a reduction of the data rate is necessitated.

In embodiments, the sensor data packet is divided into at least two data packets, wherein the data packets are transmitted with a data rate of less than 50 kbit/s and a time interval or time distance across the communication channel. By dividing the sensor data packet into the at least two data packets and by the transmission of the at least two data packets via the communication channel with a time interval, on the one hand battery load and on the other hand transmission error probability are reduced, as it is explained in the following.

Figure 8:
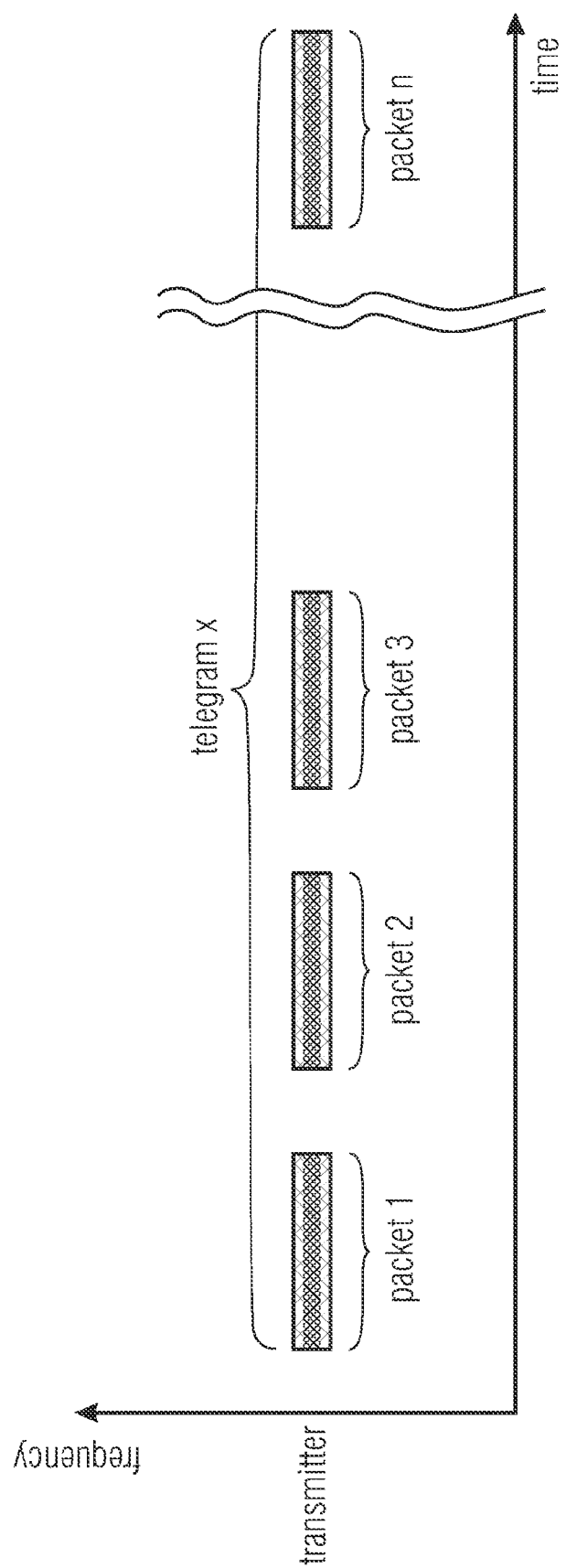
FIG. 8 is a time capacity utilization of a communication channel in a transmission of n data packets according to one embodiment of the present invention.

The telegram (sensor data packet), as for example illustrated in FIG. 8, may be transmitted with the help of several n (of equal size) data packets. If an ideal code is assumed, at the data receiver 120, when using the Code Rate c, at least $\lceil cn \rceil$ data packets have to be received error-free so that the telegram (sensor data packet) may be reconstructed error-free. Here, using the packet error probability P(PF) the probability for a telegram error P(TF) with $p=1-P(PF)$ is calculated to be $$P(TF) = P(X < \lceil cn \rceil) = \sum_{k=0}^{\lceil cn \rceil-1} (1-p)^{n-k} p^k \binom{n}{k}$$

For the following considerations it is assumed that the transmitted data packets were transmitted at random times. It is further assumed in the following that a system X is already in operation. The transmissions are to be random, the amount of data is assumed to be constant for all data transmitters of the system X, $T_x$ is the transmission duration of each data transmitter of the system X. $D_{\Sigma X}$ is the summed up duty cycle of all data transmitters of the system X.

Now a further data transmitter A is to be operated, wherein the data transmitter A relates to the battery-operated stationary sensor arrangement 100. The data transmitter A is disturbed by transmissions of the existing system X. The data transmitter A is to transmit the same amount of data as in system X and use the same modulation.

The range of the data transmitter A with respect to the existing system X is to be increased by increasing $E_b$ by the factor $f_N$. Thus, the transmission duration of the telegram is lengthened by the factor $f_N$. A telegram is transmitted divided into n individual data packets. $T_T$ is the complete transmission duration of a telegram, $T_P=T_T/n$ is the transmission duration of a data packet. Thus, the following results for the packet error rate $$P(PF) = 1 - e^{-\frac{(T_P+T_X)D_{\Sigma X}}{T_X}}$$
$$= 1 - e^{-\frac{(\frac{T_T}{n}+T_X)D_{\Sigma X}}{T_X}}$$
$$= 1 - e^{-\frac{(\frac{fT_X}{n}+T_X)D_{\Sigma X}}{T_X}}$$
$$= 1 - e^{-(\frac{f_N}{n}+1)D_{\Sigma X}}.$$

According to this, the probability of a packet error increases with a higher $f_N$ and decreases with a higher n, it is independent of the code rate c.

A data transmitter of the system X may transmit $f_N$ telegrams during the transmission time which the data transmitter A necessitates for a telegram. By this, the probability increases that a telegram of a transmitter X may be transmitted in the time in which the data transmitter A transmits a telegram.

The probability for the data transmitter X with $f_N$ transmitted telegrams, each of which has an error probability of P(XF), to receive none of them, like with the repetition code, is calculated to be $$P(XF_W)=P(XF)^N.$$

The bandwidth of the data transmitter A normalized to the data transmitters of system X is calculated to be $$b_N = \frac{f_N}{c}.$$

Figure 9:
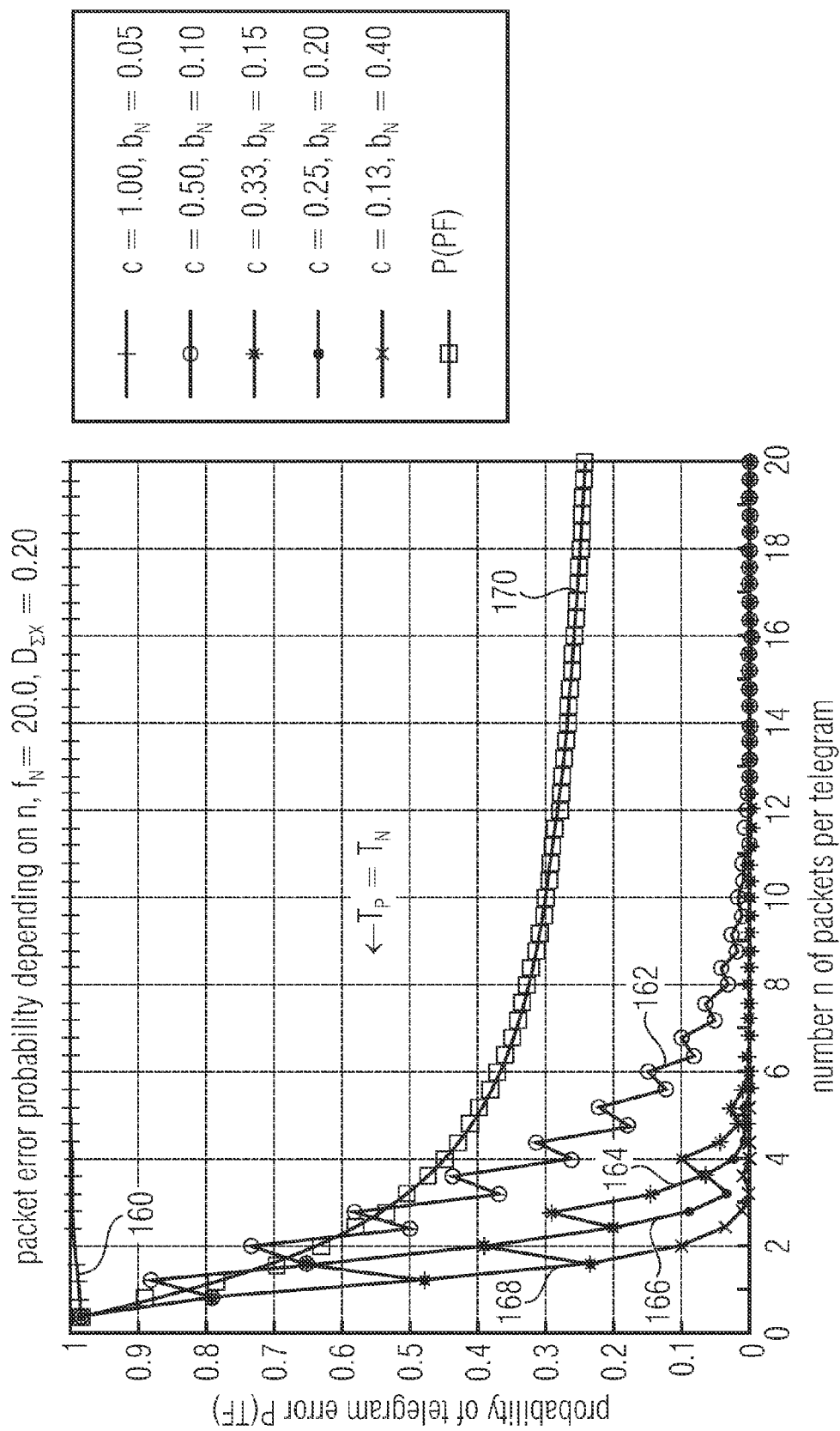
FIG. 9 is a diagram of a probability of a telegram error depending on the number of data packets for $f_N=20$, $D_{\Sigma x}=0.2$ and $P(XF_W)=2.3 \cdot 10^{-10}$.

FIG. 9 shows a diagram of a probability of a telegram error depending on the number of data packets for $f_N=20$, $D_{\Sigma X}=0.2$ und $P(XF_W)=2.3 \cdot 10^{-10}$. A first curve 160 describes the probability of a telegram error for c=1 and $b_N=0.05$; a second curve 162 describes the probability of a telegram error for c=0.5 and $b_N=0.1$; a third curve 164 describes the probability of a telegram error for c=0.33 and $b_N=0.15$; a fourth curve 166 describes the probability of a telegram error for c=0.25 and $b_N=0.20$; a fifth curve 168 describes the probability of a telegram error for c=0.13 and $b_N=0.4$; and a sixth curve 170 describes the packet error rate P(PF).

Figure 10:
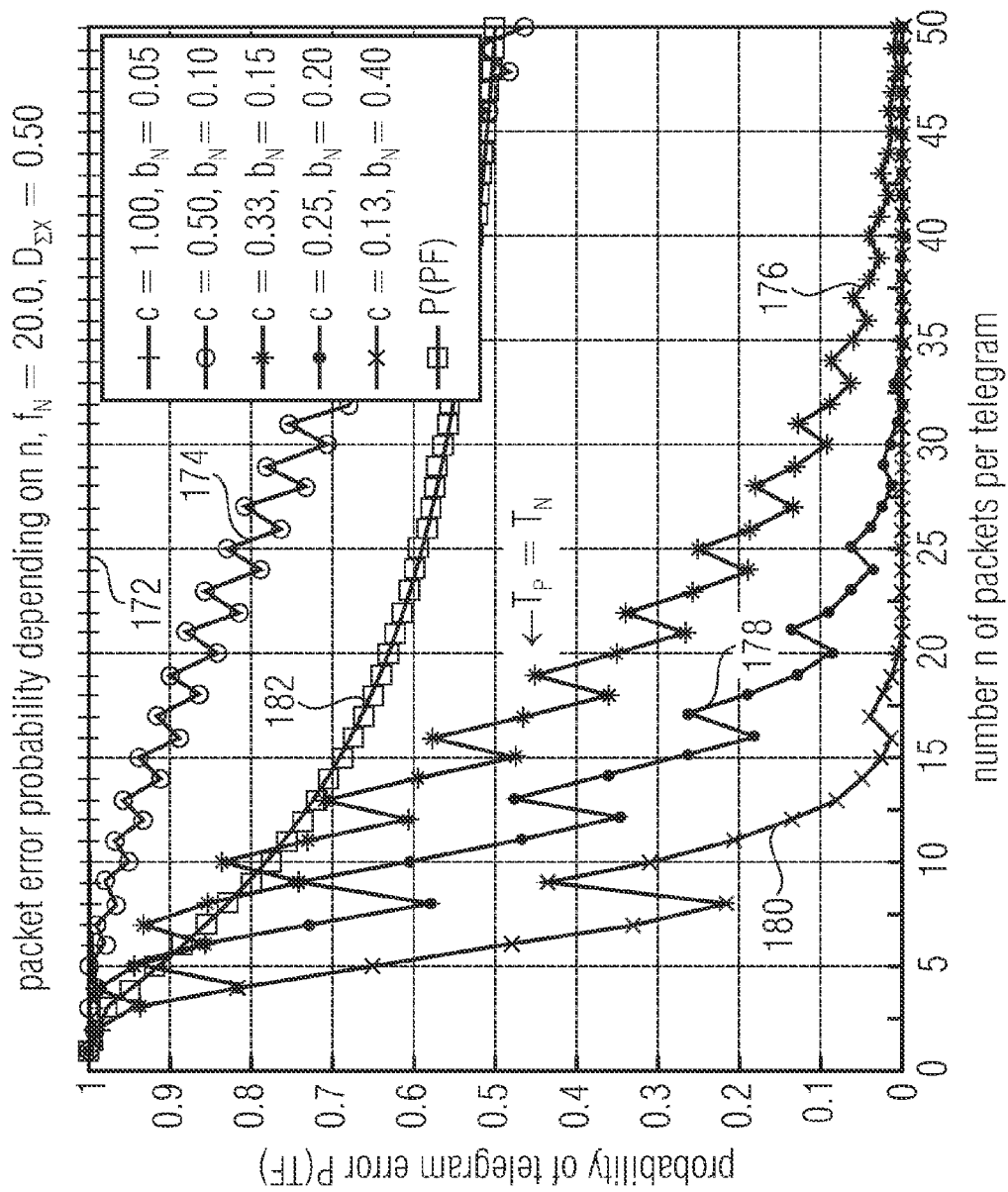
FIG. 10 is a diagram of the probability of a telegram error depending on the number of data packets for $f_N=20$, $D_{\Sigma x}=0.5$ and $P(XF_W)=1.0 \cdot 10^{-4}$.

FIG. 10 shows a diagram of a probability of a telegram error depending on the number of data packets for $f_N=20$, $D_{\Sigma X}=0.5$ und $P(XF_W)=1.0 \cdot 10^{-4}$. A first curve 172 describes the probability of a telegram error for c=1 and $b_N=0.05$; a second curve 174 describes the probability of a telegram error for c=0.5 and $b_N=0.1$; a third curve 176 describes the probability of a telegram error for c=0.33 and $b_N=0.15$; a fourth curve 178 describes the probability of a telegram error for c=0.25 and $b_N=0.20$; a fifth curve 180 describes the probability of a telegram error for c=0.13 and $b_N=0.4$; and a sixth curve 182 describes the packet error rate P(PF).

Figure 11:
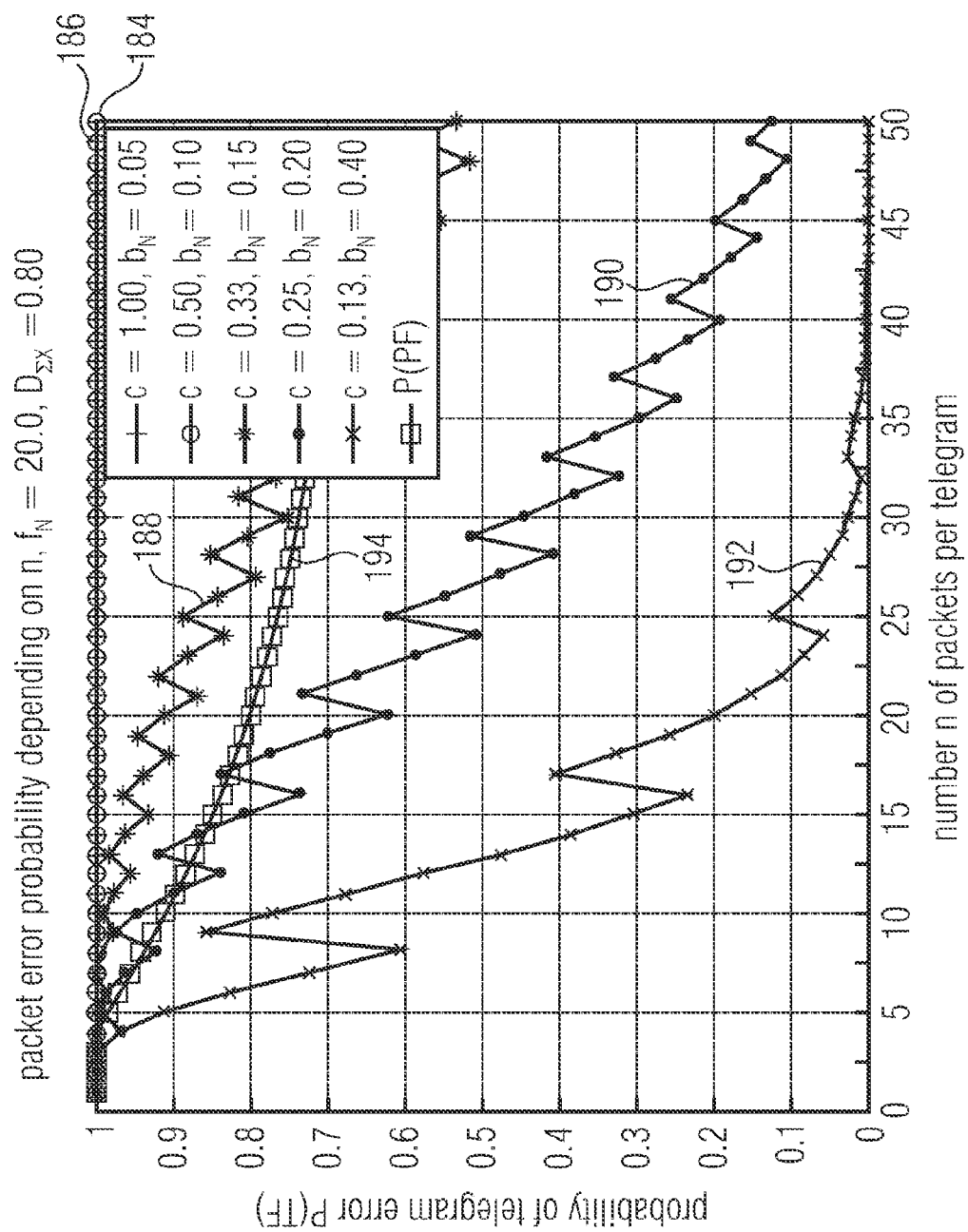
FIG. 11 is a diagram of the probability of a telegram error depending on the number of data packets for $f_N=20$, $D_{\Sigma x}=0.8$ and $P(XF_W)=1.1 \cdot 10^{-2}$.

FIG. 11 shows a diagram of a probability of a telegram error depending on the number of data packets for $f_N=20$, $D_{\Sigma X}=0.8$ and $P(XF_W)=1.1 \cdot 10^{-2}$. A first curve 184 describes the probability of a telegram error for c=1 and $b_N=0.05$; a second curve 186 describes the probability of a telegram error for c=0.5 and $b_N=0.1$; a third curve 188 describes the probability of a telegram error for c=0.33 and $b_N=0.15$; a fourth curve 190 describes the probability of a telegram error for c=0.25 and $b_N=0.20$; a fifth curve 192 describes the probability of a telegram error for c=0.13 and $b_N=0.4$; and a sixth curve 194 describes the packet error rate P(PF).

It may be seen in FIGS. 9 to 11, that dividing the telegram (sensor data packet) into at least two data packets protected by a forward error correction code increases the transmission probability. This may also be considered under the aspect "time diversity". This is the basis of the inventive concept to provide the telegram or sensor data packet with a forward error correction and divide the same into at least two data packets and transmit the same at pseudo random times. Here, the transmissions of the battery-operated stationary sensor arrangement 100 are made longer (decreased data rate) in order to increase the range. Using the outlined method the usually accompanying decrease of transmission security is counteracted.

In embodiments, thus the range is increased by a more narrow-banded transmission and additional channel encoding. Further, for improving transmission security (interference by other systems) and for a decreased load of the battery the narrow banded sensor data packets are divided into several short data packets. The data packets may additionally also be transmitted on different frequency bands (frequency hopping). Apart from this, for a better synchronization short synchronization sequences are used.

Further embodiments of the present invention provide a method for transmitting a sensor data packet in a battery-operated stationary sensor arrangement with a unidirectional data transmission. In a first step, sensor data is determined with a sensor and a sensor data packet is provided based on the sensor data, wherein the sensor data comprises an amount of data of less than 1 kbit. In a second step, data packets are generated, wherein in the generation of data packets, the sensor data packet is divided into at least two data packets and wherein each of the at least two data packets is larger than the sensor data packet. In a third step, the at least two data packets are transmitted with a data rate of less than 50 kbit/s and a time interval across a communication channel.

Further embodiments of the present invention relate to a wireless, unidirectional transmission method for fields of application with a stationary data transmitter 100 and a stationary data receiver 120, wherein the data receiver has a comparatively longer time to receive the data.

Although some aspects were described in connection with a device, it is obvious that those aspects also represent a description of the corresponding method, so that a block or a member of a device may also be regarded as a corresponding method step or as a feature of a method step. Analog to this, aspects which were described in connection with or as a method step also represent a description of a corresponding block or detail or feature of a corresponding device. Some or all of the method steps may be executed by a hardware apparatus (or using a hardware apparatus), like, for example, a microprocessor, a programmable computer or an electronic circuit. In some embodiments, some or several of the most important method steps may be executed by such an apparatus.

Depending on certain implementation requirements, embodiments of the invention may be implemented in hardware or in software. The implementation may be executed using a digital storage medium, for example a floppy disc, a DVD, a Blu-Ray disc, a CD, an ROM, a PROM, a EPROM, an EEPROM or a FLASH memory, a hard disc or another magnetical or optical memory on which electronically readable control signals are stored which may cooperate or do cooperate with a programmable computer system such that the respective method is executed. Thus, the digital storage medium may be computer-readable.

Some embodiments according to the invention thus include a data carrier which comprises electronically readable control signals which are able to cooperate with a programmable computer system such that one of the methods described herein is executed.

In general, embodiments of the present invention may be implemented as a computer program product with a program code, wherein the program code is operable in order to execute one of the methods when the computer program product is executed on a computer.

The program code may, for example, be stored on a machine-readable carrier.

Other embodiments include the computer program for executing one of the methods described herein, wherein the computer program is stored on a machine-readable carrier. In other words, an embodiment of the inventive method is thus a computer program comprising a program code for executing one of the methods described herein when the computer program is executed on a computer.

A further embodiment of the inventive method thus is a data carrier (or a digital storage medium or a computer-readable medium) on which the computer program for executing one of the methods described herein is recorded.

A further embodiment of the inventive method thus is a data stream or a sequence of signals which, for example, represent the computer program for executing one of the methods described herein. The data stream or the sequence of signals may, for example, be configured so as to be transferred via a data communication connection, for example via the internet.

A further embodiment includes a processing means, for example a computer or a programmable logic device configured or adapted to execute one of the methods described herein.

A further embodiment includes a computer on which the computer program for executing one of the methods described herein is installed.

A further embodiment according to the invention includes a device or a system which is implemented to transmit a computer program for executing at least one of the methods described herein to a receiver. The transmission may be executed, for example, electronically or optically. The receiver may, for example, be a computer, a mobile device, a memory device or a similar device. The device or the system may, for example, be a file server for transmitting the computer program to the receiver.

In some embodiments, a programmable logic device (for example a field programmable gate array, an FPGA) may be used to execute some or all functionalities of the method described herein. In some embodiments, a field-programmable gate array may cooperate with a microprocessor in order to execute one of the methods described herein. In general, in some embodiments the methods are executed by any hardware device. The same may be a universally usable hardware like a computer processor (CPU) or hardware which is specific for the method, like, for example, an ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A battery-operated stationary sensor arrangement with a unidirectional data transmission, comprising:
    a sensor for determining sensor data and for providing a sensor data packet based on the sensor data, the sensor data comprising an amount of data of less than 1 kbit;
    a generator for generating data packets which is implemented to divide the sensor data packet into at least two data packets, wherein each of the at least two data packets is shorter than the sensor data packet; and
    a transmitter for transmitting data packets which is implemented to transmit the data packets with a data rate of less than 50 kbit/s and a time interval across the communication channel,
    wherein the generator for generating data packets is implemented to divide a synchronization sequence into partial synchronization sequences and to provide each data packet with one of the partial synchronization sequences for a synchronization of the data packet in a data receiver.

2. The battery-operated stationary sensor arrangement according to claim 1, wherein the transmitter for transmitting the data packets is implemented to select the time interval of the data packets such that a battery load of the battery-operated stationary sensor arrangement is reduced.

3. The battery-operated stationary sensor arrangement according to claim 1, wherein the transmitter for transmitting that data packets is implemented to provide the data packets with a symbol rate of less than $10^6$ symbols and/or a code rate of less than 0.8.

4. The battery-operated stationary sensor arrangement according to claim 1, wherein the generator for generating data packets is implemented to divide the sensor data packet additionally into at least three data packets, wherein each of the at least three data packets is shorter than the sensor data packet; and
    wherein the transmitter for transmitting data packets is implemented to transmit the at least two data packets with a first transmission frequency via the communication channel and to transmit the at least three data packets with a second transmission frequency via the communication channel.

5. The battery-operated stationary sensor arrangement according to claim 4, wherein the generator for generating data packets is implemented to encode the at least two data packets with a first code rate and to encode the at least three data packets with a second code rate, wherein the first code rate is higher than the second code rate.

6. The battery-operated stationary sensor arrangement according to claim 1, wherein the transmitter for transmitting the data packets is implemented to transmit the data packets with a data rate of less than 10 kbits/s.

7. A system comprising a battery-operated stationary sensor arrangement according to claim 1 and a data receiver for receiving the sensor data packet, wherein the data receiver comprises:
    a receiver for receiving data packets implemented to receive the at least two data packets and to combine the at least two data packets and determine the sensor data packet; and
    a reader for reading out the sensor data packet implemented to determine the sensor data from the sensor data packet and to allocate the sensor data to the battery-operated stationary sensor arrangement.

8. The system according to claim 7, wherein the at least two data packets each comprise a partial synchronization sequence for the synchronization of the data packet in the data receiver; and wherein the receiver for receiving the data packets is implemented to localize the data packets in a receive data stream based on the partial synchronization sequences in order to receive the data packets.

9. The system according to claim 8, wherein the receiver for receiving the data packets is implemented to determine the time interval of the data packets based on the partial synchronization sequences to localize the partial synchronization sequences in the receive data stream.

10. The system according to claim 7, wherein the sensor data packet divided into at least two data packets is transmitted with a first transmission frequency and, in addition, divided into at least three data packets is transmitted with a second transmission frequency via the communication channel;

wherein the receiver for receiving the data packets is implemented to receive the at least two data packets on a first transmission frequency and/or to receive the at least three data packets on the second transmission frequency and to combine the at least two data packets and/or the at least three data packets in order to determine the sensor data packet.

11. The system according to claim 10, wherein the at least two data packets encoded with a first code rate and the at least three data packets encoded with a second code rate are transmitted via the communication channel;

wherein the receiver for receiving the data packets is implemented to decode the at least two data packets and/or to decode the at least three data packets.

12. A method for transmitting a sensor data packet in a battery-operated stationary sensor arrangement with a unidirectional data transmission, comprising:

determining sensor data with a sensor and providing a sensor data packet based on the sensor data, wherein the sensor data comprises an amount of data of less than 1 kbit;

generating data packets, wherein in the generation of data packets the sensor data packet is divided into at least two data packets, and wherein each of the at least two data packets is shorter than the sensor data packet; and transmitting the at least two data packets with a data rate of less than 50 kbit/s and a time interval via a communication channel, wherein when generating data packets a synchronization sequence is divided into partial synchronization sequences and each data packet is provided with one of the partial synchronization sequences for a synchronization of the data packet in a data receiver.

13. A non-transitory computer readable medium including a computer program including computer code for executing, when the computer program is executed on a computer or microprocessor, the method according to claim 12.

14. A battery-operated stationary sensor arrangement with unidirectional data transmission, comprising:

a sensor for determining sensor data and for providing a sensor data packet based on the sensor data, wherein the sensor data comprises an amount of data of less than 1 kbit;

a generator for generating data packets implemented to divide the sensor data packet into at least three data packets, wherein each of the at least three data packets is shorter than the sensor data packet; and a transmitter for transmitting data packets implemented to transmit the data packets with a data rate of less than 50 kbit/s and a time interval via a communication channel;

wherein the generator for generating data packets is implemented to channel-encode the at least three data packets such that only a part of the data packets is necessitated for decoding the sensor data packet.

15. A battery-operated stationary sensor arrangement with unidirectional data transmission, comprising:

a sensor for determining sensor data and for providing a sensor data packet based on the sensor data, wherein the sensor data comprises an amount of data of less than 1 kbit;

a generator for generating data packets implemented to divide the sensor data packet into at least two data packets, each of the at least two data packets being shorter than the sensor data packet; and a transmitter for transmitting data packets implemented to transmit the data packets with a data rate of less than 50 kbit/s and a time interval via a communication channel;

wherein the generator for generating data packets is implemented to additionally divide the sensor data packet into at least three data packets, each of the at least three data packets being shorter than the sensor data packet; and the transmitter for transmitting data packets being implemented to transmit the at least two data packets with a first transmission frequency via the communication channel and to transmit the at least three data packets with a second transmission frequency via the communication channel.

* * * * *